(12) United States Patent
Goyette

(10) Patent No.: US 12,508,457 B2
(45) Date of Patent: * Dec. 30, 2025

(54) SYSTEMS AND METHODS OF DYNAMIC LOW AIR ALARMS FOR DIFFERENTIAL TYPE FIRE PROTECTION VALVES

(71) Applicant: Tyco Fire Products LP, Lansdale, PA (US)

(72) Inventor: Chad A. Goyette, Tiverton, RI (US)

(73) Assignee: Tyco Fire Products LP, Cranston, RI (US)

( * ) Notice: Subject to any disclaimer, the term of this patent is extended or adjusted under 35 U.S.C. 154(b) by 1084 days.

This patent is subject to a terminal disclaimer.

(21) Appl. No.: 17/609,285

(22) PCT Filed: May 8, 2020

(86) PCT No.: PCT/US2020/032155
§ 371 (c)(1),
(2) Date: Nov. 5, 2021

(87) PCT Pub. No.: WO2020/227655
PCT Pub. Date: Nov. 12, 2020

(65) Prior Publication Data
US 2022/0230524 A1    Jul. 21, 2022

Related U.S. Application Data

(60) Provisional application No. 62/845,364, filed on May 9, 2019.

(51) Int. Cl.
*A62C 37/50* (2006.01)
*A62C 35/62* (2006.01)
*A62C 35/68* (2006.01)

(52) U.S. Cl.
CPC .............. *A62C 37/50* (2013.01); *A62C 35/62* (2013.01); *A62C 35/68* (2013.01)

(58) Field of Classification Search
CPC ....... A62C 3/004; A62C 35/62; A62C 35/645; A62C 35/68; A62C 37/50
See application file for complete search history.

(56) References Cited

U.S. PATENT DOCUMENTS 5,864,287 A * 1/1999 Evans, Jr. .............. A62C 37/50
                                                            137/557
5,971,080 A    10/1999 Loh et al.
(Continued)

OTHER PUBLICATIONS

International Search Report and Written Opinion for International Application No. PCT/US2020/032155, mail date Aug. 6, 2020, 10 pages.

*Primary Examiner* — Darren W Gorman
(74) *Attorney, Agent, or Firm* — Foley & Lardner LLP

(57) ABSTRACT

An alarm system includes a first pressure sensor, a second pressure sensor, and one or more processors. The first pressure sensor can detect a first pressure of a fluid supply of a dry pipe sprinkler system. The second pressure sensor can detect a second pressure of gas in at least one pipe of the dry pipe sprinkler system. The one or more processors can receive the first pressure from the first pressure sensor and the second pressure from the second pressure sensor, determine a target minimum pressure based on the first pressure, compare the target minimum pressure to the second pressure, and output an indication of an alarm condition based on the comparison.

17 Claims, 3 Drawing Sheets

(56) References Cited

U.S. PATENT DOCUMENTS

| | | | |
|---|---|---|---|
| 6,068,057 A * | 5/2000 | Beukema | A62C 35/62 |
| | | | 169/17 |
| 6,357,531 B1 | 3/2002 | Asselin | |
| 2006/0096763 A1 | 5/2006 | Ringer | |
| 2013/0199803 A1* | 8/2013 | Multer | A61P 31/04 |
| | | | 169/17 |
| 2014/0271253 A1 | 9/2014 | Scheffer | |
| 2017/0225021 A1* | 8/2017 | Williams | F16K 15/033 |
| 2017/0326396 A1* | 11/2017 | Pohl | F16K 27/12 |
| 2018/0264302 A1 | 9/2018 | Pohl | |
| 2018/0272170 A1 | 9/2018 | Multer | |
| 2019/0091500 A1* | 3/2019 | Jimenez | A62C 35/62 |
| 2019/0388718 A1* | 12/2019 | Pohl | A62C 35/64 |

\* cited by examiner

SYSTEMS AND METHODS OF DYNAMIC LOW AIR ALARMS FOR DIFFERENTIAL TYPE FIRE PROTECTION VALVES

CROSS-REFERENCE TO RELATED APPLICATIONS

The present application claims the benefit of and priority to U.S. Provisional Application No. 62/845,364, titled "SYSTEMS AND METHODS OF DYNAMIC LOW AIR ALARMS FOR DIFFERENTIAL TYPE FIRE PROTECTION VALVES," filed May 9, 2019, the disclosure of which is incorporated herein by reference in its entirety.

BACKGROUND

Differential type fire protection valves can use air pressure to hold closed a valve that connects a fluid supply to pipes and sprinklers. For example, differential type fire protection valves can be used in dry pipe sprinkler systems.

SUMMARY

At least one aspect relates to an alarm system. The alarm system can include a first pressure sensor, a second pressure sensor, and one or more processors. The first pressure sensor can detect a first pressure of a fluid supply of a dry pipe sprinkler system. The second pressure sensor can detect a second pressure of gas in at least one pipe of the dry pipe sprinkler system. The one or more processors can receive the first pressure from the first pressure sensor and the second pressure from the second pressure sensor, determine a target minimum pressure based on the first pressure, compare the target minimum pressure to the second pressure, and output an indication of an alarm condition based on the comparison.

At least one aspect relates to a method. The method can include detecting, by a first pressure sensor, a first pressure of a fluid supply of a dry pipe sprinkler system, detecting, by a second pressure sensor, a second pressure of gas in at least one pipe of the dry pipe sprinkler system, determining, by one or more processors, a target minimum pressure based on the first pressure, comparing, by the one or more processors, the target minimum pressure to the second pressure, and outputting, by the one or more processors, an indication of an alarm condition based on the comparison.

At least one aspect relates to a non-transitory computer-readable medium comprising processor-executable instructions that when executed by one or more processors, cause the one or more processors to receive, from a first pressure sensor, a first pressure of a fluid supply of a dry pipe sprinkler system, receive, from a second pressure sensor, a second pressure of gas in at least one pipe of the dry pipe sprinkler system, determine a target minimum pressure based on the first pressure, compare the target minimum pressure to the second pressure, and output an indication of an alarm condition based on the comparison.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
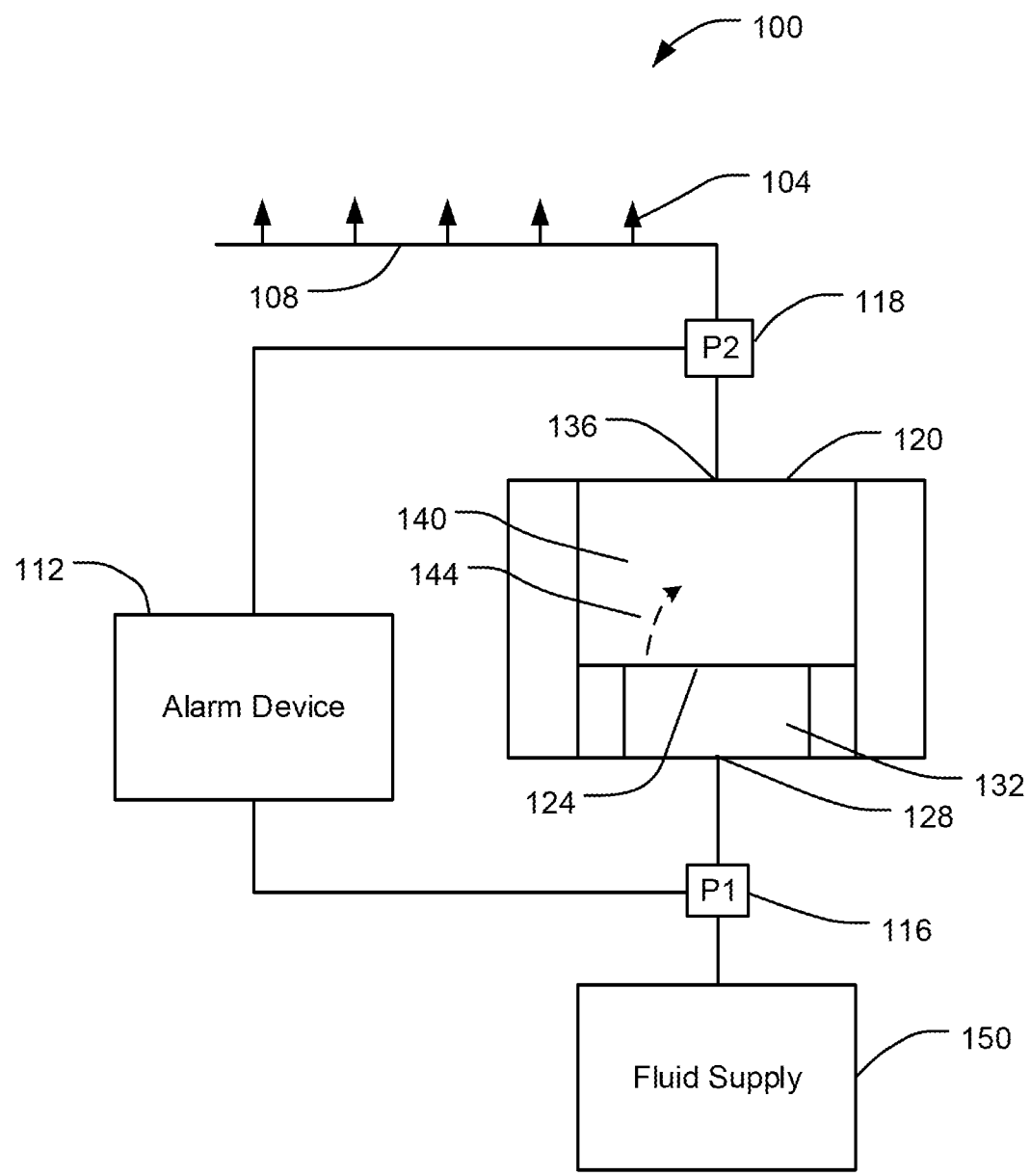
FIG. 1 is a block diagram of an alarm system of a sprinkler system.

Following below are more detailed descriptions of various concepts related to, and implementations of dynamic low air alarms, systems, and methods. Dynamic low air alarms can more accurately detect alarm conditions regarding air and water pressures in sprinkler systems, reducing the likelihood of inadvertent operation of a flow control valve or lack of an indication of a low air condition. The various concepts introduced above and discussed in greater detail below can be implemented in any of numerous ways, including in dry systems and in wet systems.

Sprinkler systems, including dry pipe sprinkler systems, can be used to protect spaces such as unheated warehouses, parking garages, store windows, attic spaces, and loading docks, which may be exposed to freezing temperatures, such that water filled pipes might freeze if used. When set for service, the dry pipe sprinkler system can be pressurized with a gas, such as air (e.g., atmospheric air) or nitrogen. When a sprinkler of the dry pipe sprinkler system is exposed to heat from a fire, the sprinkler will open, decreasing pressure in the pipe(s) connected to the sprinkler. This decrease in pressure (e.g., pressure decay, pressure drop) can be used to trigger operation of a flow control valve that connects a fluid supply, such as a water supply, to the pipes connected to the sprinkler to deliver the fluid through the sprinkler to address the fire. For example, the flow control valve can include a clapper or other mechanical component having gas on a first side of the clapper and fluid on a second, opposite side of the clapper; depending on the pressures of the gas and fluid and the surface areas of the clapper on which the gas and fluid act, changes in pressure of the gas or the fluid can cause the clapper to change state from a first state in which the clapper is closed to prevent the fluid from flowing into the pipes of the sprinkler system to a second state in which the clapper opens to allow the fluid to flow into the pipes.

Sprinkler systems can include alarms that indicate an alarm condition when pressure of the gas in the sprinkler system falls below a pressure threshold. The pressure threshold can be related to a minimum pressure below which operation of the flow control valve is triggered. A low air alarm device can be used to indicate that the pressure of the gas (e.g., system air pressure) has fallen below or decayed beyond the pressure threshold, which is a fixed or predetermined value.

In some instances, fluctuations in the pressure of the fluid from the fluid supply can only be estimated prior to or during installation and setup of the sprinkler system. For example, water pressure fluctuations can vary greatly from one system to another and from one day to another. This can make it difficult to accurately specify the pressure threshold, and can result in inadvertent operation of the flow control valve, or false positives (e.g., the alarm goes off even if the sprinklers have not opened responsive to a fire). For example, if the pressure of the fluid fluctuates in an increasing manner, the pressure of the fluid can reach a level sufficient to trigger operation of the flow control valve even if a sprinkler has not opened to cause the pressure of the gas to fall below the predetermined pressure threshold. Alarm devices and systems in accordance with the present disclosure can dynamically monitor fluid pressures to determine more accurate pressure thresholds for gas in the system, and in turn more accurate indications of alarm conditions. The alarm conditions can be outputted using visual or audio alarms as well as electronic notifications that can be transmitted to remote devices, such as a portable electronic device (e.g., cell phone) of a user.

Referring to FIG. 1, a sprinkler system 100 is depicted. The sprinkler system 100 includes a at least one sprinkler 104 coupled with at least one pipe 108. The sprinkler 104 can operate in an open state and a closed state, and may normally operate in the closed state, such as by being biased to the closed state. The sprinkler 104 can switch to the open state in response to a fire condition, such as by being actuated to open when heated by a fire. The at least one pipe 108 can include a network of pipes, such as a manifold or piping grid. Each sprinkler 104 can receive fluid from the at least one pipe 108.

In a dry pipe sprinkler system, a gas, such as air or nitrogen, can be in and flow through the at least one pipe 108. The gas can be at a greater pressure than atmospheric pressure. For example, the gas can have a pressure greater than or equal to 15 pounds per square inch (psi) and less than or equal to 60 psi. The pressure of the gas can be adjusted when the sprinkler system 100 is installed or configured in order to control factors such as valve trip time and fluid delivery time. When the sprinkler 104 switches to the open state, the gas in the at least one pipe 108 can flow out of the at least one pipe 108 due to the difference in pressure between the relatively high pressure in the at least one pipe 108 and the relatively low (e.g., atmospheric pressure) pressure outside of the at least one pipe 108. The decrease in pressure resulting from the gas flowing out of the at least one pipe 108 can be used to signal the fire condition.

The at least one pipe 108 can be coupled with an outlet 136 of a flow control valve 120. The at least one pipe 108 can receive fluid from the outlet 136 and output the fluid via the sprinkler 104. An inlet 128 of the flow control valve 120 can be coupled with a fluid supply 150. The fluid supply 150 can have a fluid such as water or other firefighting fluids. The fluid can flow from the fluid supply 150 to the inlet 128 of the flow control valve 120. The flow control valve 120 can be a diaphragm valve, such as the DV-5A manufactured by Tyco Fire Products.

The at least one pipe 108 can be coupled with an outlet 136 of a flow control valve 120. The at least one pipe 108 can receive fluid from the outlet 136 and output the fluid via the sprinkler 104. An inlet 128 of the flow control valve 120 can be coupled with a fluid supply 150. The fluid supply 150 can have a fluid such as water or other firefighting fluids. The fluid can flow from the fluid supply 150 to the inlet 128 of the flow control valve 120. The flow control valve 120 can be the DPV-1 manufactured by Tyco Fire Products.

The flow control valve 120 can have an open state in which the inlet 128 is in fluid communication with the outlet 136, and a closed state in which the inlet 128 is not in fluid communication with the outlet 136. When the inlet 128 is in fluid communication with the outlet 136, the fluid can flow from the fluid supply 150 through the flow control valve 120 into the pipe 108. For example, when the sprinkler 104 has opened and the flow control valve 120 is in the open state, fluid can flow from the fluid supply 150 and out of the pipe 108, such as to address a fire responsive to which the sprinkler 104 opened. The flow control valve 120 can be biased to the closed state. For example, the flow control valve 120 can include an adjustable member, such as a clapper 124, that can prevent fluid from flowing from the inlet 128 to the outlet 136. The clapper 124 can be between a fluid chamber 132 coupled with the inlet 128 and a gas chamber 140 (e.g., air chamber) coupled with the inlet 128.

The fluid in the fluid chamber 132 can apply a force on the clapper 124 in a direction towards the gas chamber 140, and the gas chamber 140 can apply a force on the clapper 124 in a direction 144 towards the fluid chamber 132. As depicted in FIG. 1, the clapper 124 can be held in a first position that prevents fluid from flowing from the fluid chamber 132 through the gas chamber 140 based on these forces. The clapper 124 may be biased to the first position (e.g., using a spring). When pressure in the gas chamber 140 decreases (e.g., due to the at least one sprinkler 104 opening) below a threshold (e.g., a threshold corresponding to the force applied by the fluid acting on the clapper 124), the clapper 124 can be moved away from the fluid chamber 132, such as to rotate in the direction 144, allowing fluid to flow from the fluid supply 150 through the flow control valve 120 and into the at least one pipe 108.

The flow control valve 120 may define a trip ratio corresponding to a ratio of a fluid pressure of fluid in the fluid chamber 132 to a gas pressure of gas in the gas chamber 140 for the gas to hold the clapper 124 in the first position to prevent fluid flow from the fluid chamber 132 into the one or more pipes 108. The trip ratio can depend on structural and geometric properties of the flow control valve 120, such as how the flow control valve 120 and components thereof are designed and manufactured. A first surface of the clapper 124 that the gas in the gas chamber 140 applies pressure to can be greater than a second surface of the clapper 124 that the fluid in the fluid chamber 132 applies pressure to, such that a relatively lower gas pressure can be used to hold the clapper 124 closed against a relatively higher fluid pressure. The trip ratio can correspond to a minimum pressure differential for operation of the flow control valve 120 (e.g., depending on factors such as the mass of the clapper 124 and the areas of the first and second surfaces of the clapper 124). The trip ratio may be greater than or equal to 1 and less than or equal to 20. The trip ratio may be greater than or equal to 2 and less than or equal to 9. The trip ratio may be greater than or equal to 4 and less than or equal to 7. The trip ratio may be greater than or equal to 5 and less than or equal to 6. The trip ratio may be 5.5. For example, if the trip ratio is 5.5, and the fluid pressure is 55 pounds per square inch (psi), then if the gas pressure falls below 10 psi, the clapper 124 can move from the closed state to the open state.

The fluctuation of the first pressure can be great enough such that using a predetermined minimum pressure may not enable the low air alarm condition to be detected. For example, an expected fluctuation of the first pressure can be greater than a threshold fluctuation such that the predetermined minimum pressure, which can correspond to a ratio of the first pressure to the second pressure during the expected fluctuation, does not cause the alarm device 112 to output an indication of the alarm condition. For example, if the trip ratio is 5.5, the first pressure is 55 psi, the second pressure is 15 psi, and the predetermined minimum pressure is 12 psi, then a fluctuation of the first pressure from 55 psi to more than 82.5 psi could cause the flow control valve 120 to trip even though the second pressure of 15 psi does not fall below the predetermined minimum pressure of 12 psi.

The sprinkler system can include an alarm device 112. The alarm device 112 can generate and output an indication of an alarm condition. For example, the alarm device 112 can detect a low air alarm condition and generate and output an indication of the low air alarm condition.

The alarm device 112 can include or be coupled with a first pressure sensor 116. The first pressure sensor 116 can be a pressure transducer. The first pressure sensor 116 can detect a first pressure of the fluid of the fluid supply 150. The first pressure sensor 116 can be coupled with the fluid supply 150 to detect the first pressure of the fluid in the fluid supply 150, or as depicted in FIG. 1, can be coupled with a pipe between the fluid supply 150 and the flow control valve 120 to detect the pressure of the fluid supply 150. The first pressure sensor 116 can transmit the first pressure to the alarm device 112. The alarm device 112 can include the first pressure sensor 116 and the first pressure sensor 116 can be coupled with the fluid supply 150 or the pipe between the fluid supply 150 and the flow control valve 120 by one or more pipes (e.g., by tapping the fluid supply 150 or the pipe between the fluid supply 150 and the flow control valve 120).

The alarm device 112 can include or be coupled with a second pressure sensor 118. The second pressure sensor 118 can be a pressure transducer. The second pressure sensor 118 can detect a second pressure of the gas of the one or more pipes 108. The second pressure sensor 118 can be coupled with the one or more pipes 108 to detect the second pressure of the gas (e.g., air) in the one or more pipes 108. The second pressure sensor 118 can be coupled with the one or more pipes 108 between the one or more sprinklers 104 and the flow control valve 120 or downstream of at least one sprinkler 104 relative to the flow control valve 120 (e.g., on an opposite side of at least one sprinkler 104 relative to the flow control valve 120). The second pressure sensor 118 can transmit the second pressure to the alarm device 112. The alarm device 112 can include the second pressure sensor 118 and the second pressure sensor 118 can be coupled with the one or more pipes via a connection with the one or more pipes (e.g., by tapping the one or more pipes 108).

The alarm device 112 can receive the first pressure from the first pressure sensor 116, receive the second pressure from the second pressure sensor 118, and generate the indication of the alarm condition based on the first pressure and the second pressure. For example, the alarm device 112 can generate the indication of the alarm condition based on dynamically determining a pressure threshold corresponding to a low air alarm based on fluctuations of the first pressure. Because the forces holding the clapper 124 in the first position depend on the first pressure and the second pressure (or the first pressure and second pressure as detected by the respective pressure sensors 116, 118 and adjusted for corresponding pressure drops), by using a dynamic pressure threshold, the alarm device 112 can more accurately detect low air conditions. In a normal mode of operation of the sprinkler system 100 (e.g., when fluctuations of the first pressure are within a threshold level of an expected value of the first pressure, such as plus or minus 10 percent, or plus or minus 5 percent), a ratio of the first pressure to the second pressure can be at least three.

Figure 2:
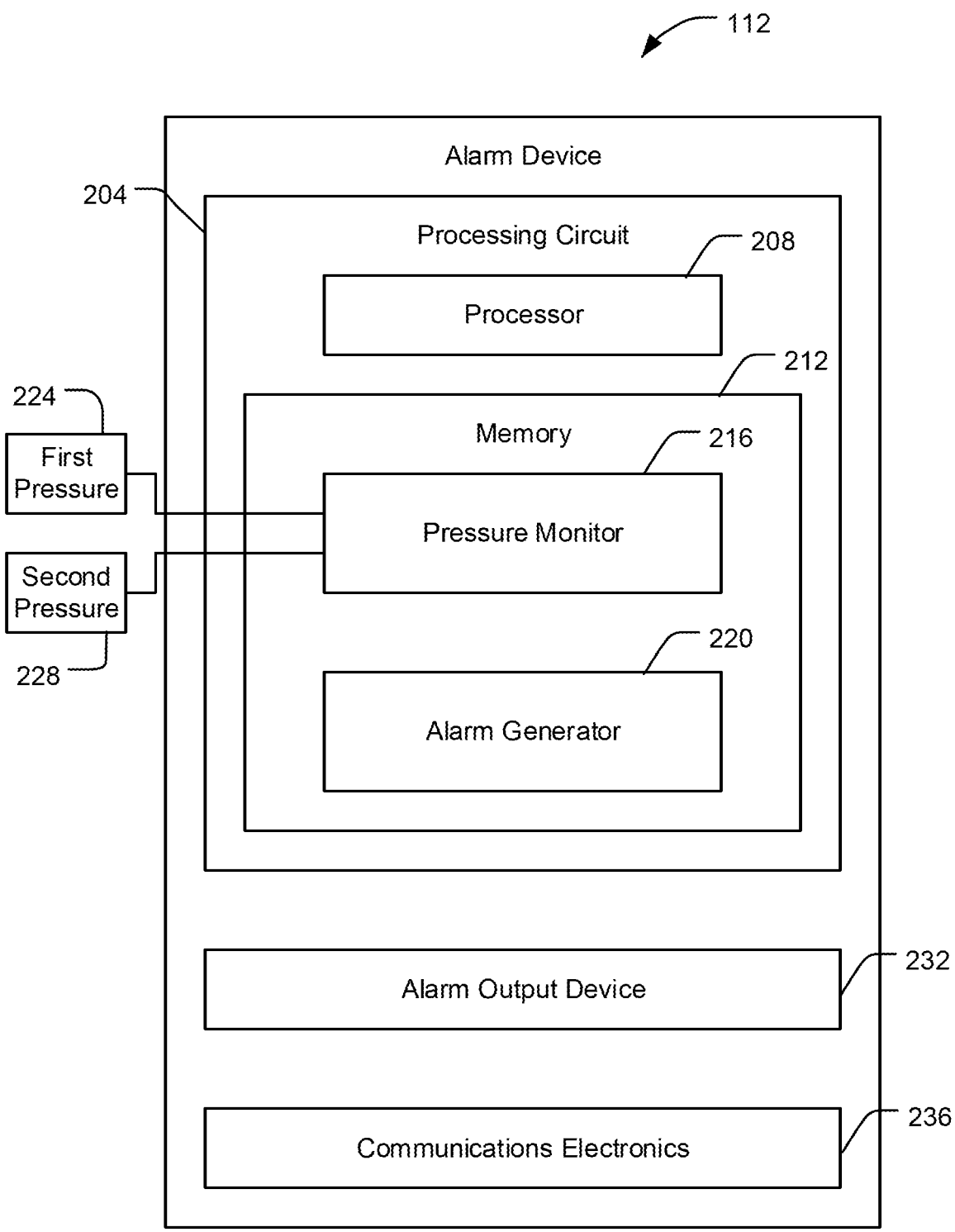
FIG. 2 is a block diagram of an alarm device of a sprinkler system.

Referring to FIG. 2 and further to FIG. 1, the alarm device 112 is depicted. The alarm device 112 can include a processing circuit 204 including a processor 208 and memory 212. The processor 208 may be implemented as a specific purpose processor, an application specific integrated circuit (ASIC), one or more field programmable gate arrays (FPGAs), a group of processing components, or other suitable electronic processing components. The memory 212 is one or more devices (e.g., RAM, ROM, flash memory, hard disk storage) for storing data and computer code for completing and facilitating the various user or client processes, layers, and modules described in the present disclosure. The memory 212 may be or include volatile memory or non-volatile memory and may include database components, object code components, script components, or any other type of information structure for supporting the various activities and information structures of the inventive concepts disclosed herein. The memory 212 is communicably connected to the processor 208 and includes computer code or instruction modules for executing one or more processes described herein. The memory 212 can include various circuits, software engines, and/or modules that cause the processor 208 to execute the systems and methods described herein.

The alarm device 112 can include a pressure monitor 216. The pressure monitor 216 can receive a first pressure 224 (e.g., of fluid of fluid supply 150). The pressure monitor 216 can receive the first pressure 224 from a first pressure sensor (e.g., first pressure sensor 116 described with reference to FIG. 1). The pressure monitor 216 can periodically sample the first pressure 224.

The pressure monitor 216 can receive a second pressure 228 (e.g., of gas, such as air, in pipes 108 of sprinkler system 100). The pressure monitor 216 can receive the second pressure 228 from a second pressure sensor (e.g., second pressure sensor 118). The pressure monitor 216 can periodically sample the second pressure 228.

The pressure monitor 216 can maintain a target minimum pressure. The target minimum pressure can correspond to a low air alarm condition, such that if the second pressure 228 is less than the target minimum pressure, the valve (e.g., flow control valve 120) may trip by switching from a closed state to an open state due to the second pressure 228 being less than the target minimum pressure—even if one or more sprinklers 104 of the sprinkler system 100 have not necessarily opened to allow gas to flow out of the sprinklers 104. In some embodiments, the pressure monitor 216 uses a target maximum pressure associated with the first pressure 224 (e.g., a maximum pressure defined based on an expected value of the first pressure 224). In some embodiments, the pressure monitor 216 uses a target pressure ratio of the second pressure 228 and first pressure 224.

The pressure monitor 216 can determine the target minimum pressure based on the first pressure 224. For example, the pressure monitor 216 can determine the target minimum pressure by applying a ratio to the first pressure 224. The ratio can be a trip ratio corresponding to an expected ratio of the second pressure 228 to the first pressure 224 (e.g., on either side of the clapper 124, which may take into account any pressure drop between where the first pressure 224 and second pressure 228 are respectively measured and where the gas and fluid respectively apply pressure to the clapper 124) sufficient for the gas pressure in the gas chamber 140 to hold the clapper 124 closed against the fluid pressure in the fluid chamber 132. For example, the flow control valve 120 may be designed to have a trip ratio of 5.5 to 1, such as if the first pressure 224 is expected to be 55 psi and the flow control valve 120 is expected to trip when the second pressure 228 falls below 10 psi. As compared to systems that rely on a predetermined minimum pressure to determine whether a low air condition is present, the pressure monitor 216 can apply the ratio to the first pressure 224 to more accurately determine how much gas pressure should be used to hold the clapper 124 closed against the first pressure 224 of the fluid in the fluid chamber 132. For example, if the trip ratio is 5.5:1, and the first pressure 224 is 55 psi during installation, but then fluctuates to 60 psi, the pressure monitor 216 can determine the target minimum pressure by applying the trip ratio to the value of 60 psi of the first pressure 224, rather than the value of 55 psi. For example, the pressure monitor 216 can determine the target minimum pressure by dividing the first pressure 224 by the trip ratio.

The pressure monitor 216 can determine the target minimum pressure based on a safety factor. The pressure monitor 216 can use the safety factor to build in a level of tolerance to the target minimum pressure, as well as to cause an alarm corresponding to the target minimum pressure to be generated before the second pressure 228 falls below a level at which the flow control valve 120 may trip. The safety factor can be a value in psi that the pressure monitor 216 adds to a value resulting from dividing the first pressure 224 by the trip ratio. For example, the safety factor can be greater than or equal to 2 psi and less than or equal to 20 psi. The safety factor can be 10 psi. The safety factor can be user defined. The pressure monitor 216 can determine the target minimum pressure by dividing the first pressure 224 by the trip ratio, and adding the safety factor to the result of dividing the first pressure 224 by the trip ratio. The safety factor can be a multiplicative factor applied to the result of dividing the first pressure 224 by the trip ratio (e.g., multiplying the result by a factor greater than or equal to 1.1 and less than or equal to 2).

The pressure monitor 216 can compare the second pressure 228 to the target minimum pressure to determine whether a low air alarm condition is present or satisfied. For example, the pressure monitor 216 can determine that the low air alarm condition is satisfied responsive to the second pressure 228 being less than the target minimum pressure. As such, the pressure monitor 216 can dynamically monitor the second pressure 228 in a manner responsive to fluctuations of the first pressure 224, which can enable more accurate detection of the low air alarm condition.

The alarm device 112 can include an alarm generator 220. The alarm generator 220 can generate an alarm, such as a low air alarm, responsive to the pressure monitor 216. For example, the alarm generator 220 can generate the alarm responsive to the pressure monitor 216 indicating that the second pressure 228 is less than the target minimum pressure. The alarm generator 220 can generate the alarm to include at least one of the first pressure 224, the second pressure 228, and the target minimum pressure.

The alarm device 112 can include an alarm output device 232. The alarm output device 232 can receive the alarm from the alarm generator 220 and output an indication of the alarm responsive to receiving the alarm. For example, the alarm output device 232 can generate at least one of a visual indication or an audio indication of the alarm. The alarm output device 232 can include one or more lights (e.g., LED lights) or display devices (e.g., OLED, LED, LCD, CRT displays), speakers, tactile feedback devices, or other output devices to provide information to a user. The alarm output device 232 can use communications electronics 236 described below to transmit the alarm to a remote device, such as a portable electronic device (e.g., an application of a portable electronic device) to use the portable electronic device to present the notification.

The alarm device 112 can include communications electronics 236. The communications electronics 236 can receive the alarm from the alarm generator 220 and provide an alarm signal corresponding to the alarm to a remote device, such as a fire alarm control panel or a portable electronic device. The communications electronics 236 can include wired or wireless interfaces (e.g., jacks, antennas, transmitters, receivers, transceivers, wire terminals, etc.) for conducting data communications with various systems, devices, or networks. For example, the communications electronics 236 can include an Ethernet card and port for sending and receiving data via an Ethernet-based communications network. The communications electronics 236 can include a WiFi transceiver for communicating via a wireless communications network. The communications electronics 236 can communicate via local area networks (e.g., a building LAN), wide area networks (e.g., the Internet, a cellular network), and/or conduct direct communications (e.g., NFC, Bluetooth). The communications electronics 236 can conduct wired and/or wireless communications. For example, the communications electronics 236 can include one or more wireless transceivers (e.g., a Wi-Fi transceiver, a Bluetooth transceiver, a NFC transceiver, a cellular transceiver).

Figure 3:
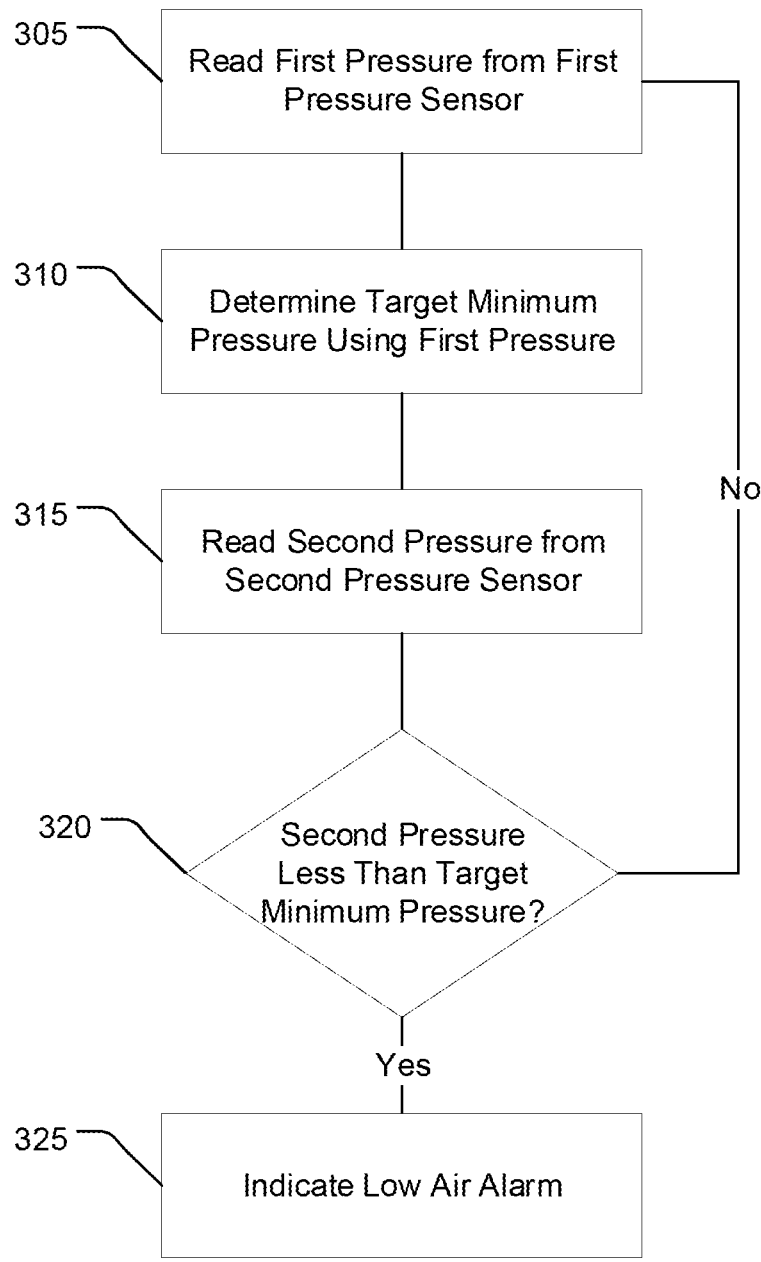
FIG. 3 is a flow diagram of a method of operating an alarm device of a sprinkler system.

Referring now to FIG. 3, a method 300 of operating an alarm device of a sprinkler system is depicted. The method 300 can be performed using various systems and devices described herein, such as the sprinkler system 100 and the alarm device 112.

At 305, a first pressure is received (e.g., read) from a first pressure sensor. The first pressure sensor can detect the first pressure as a pressure of fluid in a fluid supply, such as water or other firefighting fluids. The first pressure sensor can be coupled with the fluid supply or with piping between the first pressure sensor and the fluid supply. The first pressure can be received by periodically sampling the first pressure sensor.

At 310, a target minimum pressure is determined using the first pressure. The target minimum pressure can correspond to a low air alarm condition. The target minimum pressure can be determined by applying a ratio to the first pressure, such as a trip ratio corresponding to a pressure ratio (e.g., water to air) on either side of a movable element of a flow control valve sufficient to hold the movable element in a closed state. For example, if the trip ratio is a ratio of (relatively high) water pressure to (relatively low) air pressure, the first pressure can be divided by the trip ratio to determine the target minimum pressure. The target minimum pressure can be determined using a safety factor. For example, the safety factor can be applied to the value resulting from dividing the pressure by the trip ratio.

At 315, a second pressure is received (e.g., read) from a second pressure sensor. The second pressure sensor can detect the second pressure as a pressure of gas (e.g., air) in a pipe of the sprinkler system. The second pressure sensor can be coupled with the pipe or connected by additional piping with a point at which the second pressure is to be detected. The second pressure can be received by periodically sampling the second pressure sensor.

At 320, the second pressure is compared to the target minimum pressure to determine whether the second pressure is less than the target minimum pressure, such as to determine if a low air alarm condition exists. If the second pressure is not less than the target minimum pressure (e.g., second pressure is equal to or greater than the target minimum pressure), then the low air alarm condition may not exist, and the first and second pressures can continue to be monitored and used to monitor the low air alarm condition by dynamically determining the target minimum pressure.

At 325, responsive to determining that the second pressure is less than the target minimum pressure, a low air alarm can be indicated. For example, an alarm signal can be generated responsive to the second pressure being less than the target minimum pressure. The alarm signal can be provided to an alarm output device to cause the alarm output device to generate at least one of a visual indication and an audio indication of the alarm. The alarm signal can be transmitted to a remote device, such as a remote alarm, electronic device, or fire alarm control panel, to communicate the low air alarm condition.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. An alarm system, comprising:
a first pressure sensor that detects a first pressure of a fluid supply of a dry pipe sprinkler system;
a second pressure sensor that detects a second pressure of gas in at least one pipe of the dry sprinkler system, a ratio of the first pressure to the second pressure is greater than or equal to 3:1 in a normal mode of operation of the dry pipe sprinkler system; and
one or more processors that:
- receive the first pressure from the first pressure sensor and the second pressure from the second pressure sensor,
- determine a target minimum pressure, based on the first pressure, that corresponds to a low air alarm condition at which a flow control valve between the fluid supply and the at least one pipe trips by switching from a closed state to an open state,
- compare the target minimum pressure to the second pressure, and
- output an indication of an alarm condition based on the comparison.

2. The alarm system of claim 1, comprising:
the one or more processors determine the target minimum pressure using a safety factor and a trip ratio applied to the first pressure.

3. The alarm system of claim 1, comprising:
the one or more processors output the indication of the alarm condition by transmitting the indication to a remote device.

4. The alarm system of claim 1, comprising:
the one or more processors output the indication of the alarm condition responsive to the second pressure being less than the target minimum pressure.

5. The alarm system of claim 1, comprising:
an expected fluctuation of the first pressure is greater than a threshold fluctuation such that a predetermined minimum pressure corresponding to a ratio of the second pressure to the first pressure during the expected fluctuation does not cause the one or more processors to output the indication of the alarm condition.

6. The alarm system of claim 1, comprising:
the fluid supply includes water, and the gas includes air.

7. A method, comprising:
- detecting, by a first pressure sensor, a first pressure of a fluid supply of a dry pipe sprinkler system;
- detecting, by a second pressure sensor, a second pressure of gas in at least one pipe of the dry pipe sprinkler system, a ratio of the first pressure to the second pressure is greater than or equal to 3:1 in a normal mode of operation of the dry pipe sprinkler system;
- determining, by one or more processors, a target minimum pressure, based on the first pressure that corresponds to a low air alarm condition at which a flow control valve between the fluid supply and the at least one pipe trips by switching from a closed state to an open state;
- comparing, by the one or more processors, the target minimum pressure to the second pressure; and
- outputting, by the one or more processors, an indication of an alarm condition based on the comparison.

8. The method of claim 7, comprising:
determining, by the one or more processors, the target minimum pressure using a safety factor and a trip ratio applied to the first pressure.

9. The method of claim 7, comprising:
transmitting, by the one or more processors, the indication of the alarm condition to a remote device.

10. The method of claim 7, comprising:
outputting, by the one or more processors, the indication of the alarm condition responsive to the second pressure being less than the target minimum pressure.

11. The method of claim 7, comprising:
an expected fluctuation of the first pressure is greater than a threshold fluctuation such that a predetermined minimum pressure corresponding to a ratio of the second pressure to the first pressure during the expected fluctuation does not cause the one or more processors to output the indication of the alarm condition.

12. The method of claim 7, comprising:
the fluid supply includes water, and the gas includes air.

13. A non-transitory computer-readable medium comprising processor-executable instructions that when executed by one or more processors, cause the one or more processors to:
- receive, from a first pressure sensor, a first pressure of a fluid supply of a dry pipe sprinkler system;
- receive, from a second pressure sensor, a second pressure of gas in at least one pipe of the dry pipe sprinkler system, a ratio of the first pressure to the second pressure is greater than or equal to 3:1 in a normal mode of operation of the dry pipe sprinkler system;
- determine a target minimum pressure, based on the first pressure, that corresponds to a low air alarm condition at which a flow control valve between the fluid supply and the at least one pipe trips by switching from a closed state to an open state;
- compare the target minimum pressure to the second pressure; and
- output an indication of an alarm condition based on the comparison.

14. The non-transitory computer-readable medium of claim 13, comprising instructions that cause the one or more processors to:
determine the target minimum pressure using a safety factor and by applying a trip ratio to the first pressure.

15. The non-transitory computer-readable medium of claim 13, comprising instructions that cause the one or more processors to:
transmit the indication of the alarm condition to a remote device.

16. The non-transitory computer-readable medium of claim 13, comprising instructions that cause the one or more processors to:
output the indication of the alarm condition responsive to the second pressure being less than the target minimum pressure.

17. The non-transitory computer-readable medium of claim 13, comprising:
an expected fluctuation of the first pressure is greater than a threshold fluctuation such that a predetermined minimum pressure corresponding to a ratio of the second pressure to the first pressure during the expected fluctuation does not cause the one or more processors to output the indication of the alarm condition.

* * * * *